J. A. EVARTS & P. CINQUINI.

Drawer-Pull Label-Holders.

No. 5,395. Reissued May 6, 1873.

Witnesses.

J. H. Thompson

C. J. Tibbits

Bradley & Hubbard
assignees of
John A. Evarts & Pietro Cinquini
Inventors
By Atty.

Wm. E. Earle

AM. PHOTO-LITHOGRAPHIC CO. N.Y. (OSBORNE'S PROCESS)

UNITED STATES PATENT OFFICE.

JOHN A. EVARTS AND PIETRO CINQUINI, OF WEST MERIDEN, CONNECTICUT, ASSIGNORS TO BRADLEY AND HUBBARD, OF SAME PLACE.

IMPROVEMENT IN DRAWER-PULL LABEL-HOLDERS.

Specification forming part of Letters Patent No. 113,506, dated April 11, 1871; reissue No. 5,395, dated May 6, 1873; application filed April 3, 1873.

*To all whom it may concern:*

Be it known that we, JOHN A. EVARTS and PIETRO CINQUINI, of West Meriden, in the county of New Haven and State of Connecticut, have invented a new Improvement in Drawer-Pull; and we do hereby declare the following, when taken in connection with the accompanying drawing and the letters of reference marked thereon, to be a full, clear, and exact description of the same, and which said drawing constitutes part of this specification, and represents, in—

Figure 1:
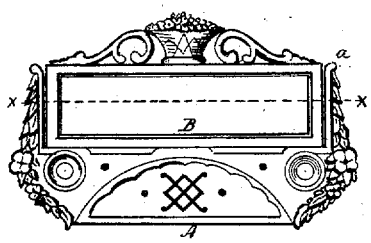
Figure 2:
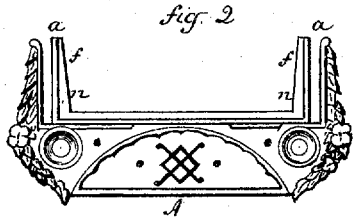
Figure 4:
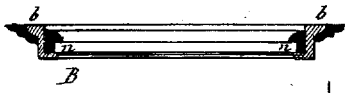
Figure 5:
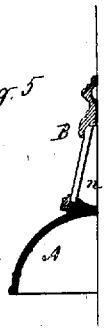

Fig. 1, a front view, with the label-plate in place; Fig. 2, a front view of the pull, the said plate re[redacted] the said plate detached; Fig. 4, a longitudinal central section on line *x x* of Fig. 1; Fig. 5, a vertical transverse section; and, in Fig. 6, a vertical transverse section of a modification of the same.

This invention relates to an improvement in that class of drawer-pulls in which is combined the label or mark indicating the contents of the drawer, the object being to construct the pull and label-plate so that the said plate may be easily removed for changing the label without detaching the pull from the drawer. Our invention consists in a combined drawer-pull and label-holder, in which the frame which incloses the label is constructed so as to be detached, to allow the introduction or removal of the label without detaching the pull.

Figure 3:
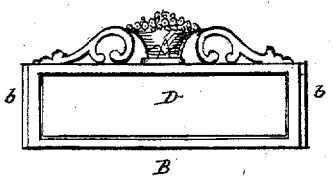

A is the drawer-pull proper, extending up to form arms or grooves *a* for the reception of the label-plate, the said arms being shown in solid black, Fig. 4. The label-plate consists of a frame, B, provided with flanges *b* to sit in the grooves *a*, as seen in Fig. 3, and denoted in line-section in Fig. 4. The frame B is open to form a panel, D, through which the label inserted is seen. The inner arm *f* of the slot is formed with a shoulder or lip, *n*, (see Figs. 4 and 5,) into which the label is set; then the frame is put in place, covering the edge of the label. By preference, the face of the panel is inclined, as in Fig. 5.

Other means may be employed for securing the frame; the object, as before mentioned, being accomplished by constructing the pull and frame so that the frame may be detached without removing the pull.

Figure 6:
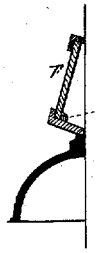

The label may be inserted and secured in the frame by constructing the frame as in Fig. 6, F representing the label, which is placed in the frame, and secured by putty or other material, as at *m*.

Whenever desirable to change the label, or for any purpose to remove it, simply lift the frame from its seat, make the change required, and replace the frame.

We claim as our invention—

A drawer-pull and label-holder, combined, when the frame which incloses the label is made detachable for the introduction or removal of the label without detaching the pull, substantially as described.

JOHN A. EVARTS.
PIETRO CINQUINI.

Witnesses:
C. P. IVES,
CHAS. F. LINSLEY.